United States Patent
Brotzmann

(10) Patent No.: US 9,200,338 B2
(45) Date of Patent: Dec. 1, 2015

(54) METHOD FOR PREHEATING IRON AGGLOMERATES

(75) Inventor: Karl Brotzmann, Amberg (DE)

(73) Assignee: Saarstahl AG, Volklingen (DE)

(*) Notice: Subject to any disclaimer, the term of this patent is extended or adjusted under 35 U.S.C. 154(b) by 1856 days.

(21) Appl. No.: 11/913,460

(22) PCT Filed: Jan. 4, 2006

(86) PCT No.: PCT/EP2006/000036
§ 371 (c)(1),
(2), (4) Date: Mar. 26, 2008

(87) PCT Pub. No.: WO2007/076896
PCT Pub. Date: Jul. 12, 2007

(65) Prior Publication Data
US 2010/0058892 A1    Mar. 11, 2010

(51) Int. Cl.
C22B 1/00 (2006.01)
C21B 13/00 (2006.01)
C21C 5/52 (2006.01)

(52) U.S. Cl.
CPC .............. C21B 13/0086 (2013.01); C21C 5/527 (2013.01)

(58) Field of Classification Search
None
See application file for complete search history.

(56) References Cited

U.S. PATENT DOCUMENTS

| 4,290,800 A | 9/1981 | Sensis et al. |
| 5,535,991 A | 7/1996 | Kepplinger et al. |
| 2002/0011132 A1* | 1/2002 | Pavlicevic et al. .............. 75/380 |

FOREIGN PATENT DOCUMENTS

| DE | 2840945 | 4/1980 |
| DE | 4216891 | 11/1993 |
| EP | 1160337 | 12/2001 |
| WO | 9963119 | 12/1999 |
| WO | 0047780 | 8/2000 |

OTHER PUBLICATIONS

Kaushik et al, Behavior of Direct Reduced Iron and Hot Briquetted Iron in the Upper Blast Furnace Shaft: Part I. Fundamentals of Kinetics and Mechanism of Oxidation, 37B Metallurgical and Mat'l Transactions B 715-725 (2006).*

International Search Report for PCT/EP2006/000036 dated Apr. 24, 2006.

* cited by examiner

Primary Examiner — Yoshitoshi Takeuchi
(74) Attorney, Agent, or Firm — Andrus Intellectual Property Law, LLP

(57) ABSTRACT

A method for preheating iron agglomerate by a hot gas stream having the following steps:
supplying the iron agglomerate in an iron agglomerate bed;
heating the gas to the preheating temperature in a heat exchanger; and
passing the hot gas through the iron agglomerate bed, the gas flow rate being such that the temperature drop of the hot gas occurs over a relatively thin layer in the iron agglomerate bed so that a temperature front moves through the bed in the course of heating.

8 Claims, 1 Drawing Sheet

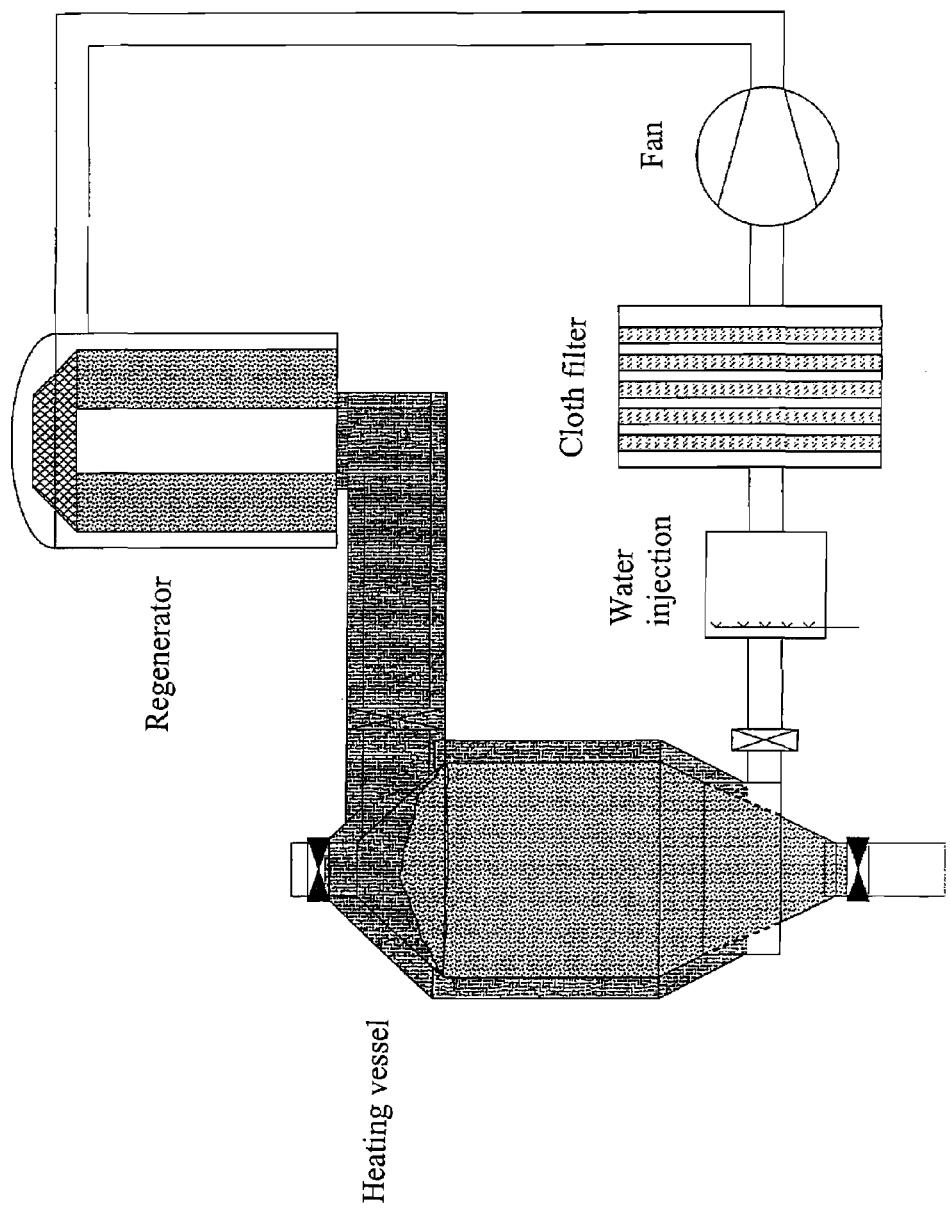

METHOD FOR PREHEATING IRON AGGLOMERATES

In steelmaking, increasing use is made of iron agglomerates which are produced from iron ore by so-called direct reduction methods. They are normally so-called DRI pellets (also known as sponge iron) and HBI briquettes today. DRI pellets are spherical and have a diameter of approximately 15 mm, HBI briquettes are cuboid with dimensions of approx. 30×50×100 mm.

The agglomerates lead to considerable disadvantages in smelting compared to scrap, however. This is firstly due to the fact that approx. 5-8% of the iron is present in oxidic form as wuestite for process reasons. But their physical condition, which leads to a lower void volume compared to scrap, also impedes smelting. For smelting agglomerates approx. 600 kWh/t of steel is therefore required e.g. in the electric arc furnace compared to 400 kWh/t of steel for smelting scrap.

To reduce this disadvantage, DRI pellets are e.g. charged immediately from the direct reduction process into the smelting furnace at a temperature of approx. 650° C., thereby saving about 170 kWh/t of steel. This direct connection can of course only be used if the direct reduction plant and the smelting unit are close together spatially. The plants for this purpose are very elaborate.

A method was also described in "Transactions (p. 11, vol. 28, 1988)" for preheating HBI briquettes by passing the furnace off-gases through a bed of HBI briquettes. Because of the strong oxidation at higher temperatures, the preheating temperature should be below 700° C. The wuestite content, which is stated as 8%, is only slightly reduced at this temperature and leads to uncontrolled foaming of the slag upon addition to a carbonaceous iron bath. The description and pictures furthermore indicate that the off-gases leave the bed of HBI briquettes at high temperature. Effective preheating times are stated as 5-10 minutes.

The problem underlying the invention is to avoid the considerable disadvantages existing in the smelting of iron agglomerates and to show a new way of advantageously utilizing the otherwise disadvantageous physical condition of said agglomerates for a preheating method and thus considerably reducing the energy for smelting.

The solution to the problem is effected by a method according to claim 1. Advantageous developments of said method are stated in the subclaims.

The basis for the present invention is the surprising finding that a hot gas does not drop linearly in temperature when flowing through a bed of iron agglomerate under certain conditions, but that the heating gas is cooled practically completely within a thin layer. Said layer has a layer thickness dependent on the iron agglomerate. The layer thickness is thus approx. 20 to 30 cm with the pellets and about 50 cm with the briquettes. During the heating process a temperature front thus moves through the bed and the heating gases leaving the bed remain at low temperature until shortly before the complete heating of the total charge. This makes it possible to recycle inert gas for heating, without additional cooling. In particular, the temperature of the heating gas leaving the bed is approximately ambient temperature or slightly, i.e. in the range of about ten degrees, thereabove, at an inflow temperature of approx. 800 to 1100° C. at the onset of the heating process. Only when the temperature front has traveled almost through the entire bed, the temperature of the heating gas leaving the bed starts to rise, and it reaches about 180 bis 220° C. towards the end of the heating process.

The inventive effect on the temperature distribution in the agglomerate bed is obtained when the average gas flow rate of the circulating heating gas is below 6,000 $Nm^3/hm^2$ with DRI pellets and below 12,000 $Nm^3/hm^2$ with HBI briquettes, based on the free surface of the agglomerate bed. The average gas flow rate is preferably between approximately 1,000 and 4,000 $Nm^3/h$ and more preferably between approximately 1,500 and 3,000 $Nm^3/h$ per 1 $m^2$ of free surface of the agglomerate bed for DRI pellets, and between approximately 2,000 and 7,000 $Nm^3/h$ and more preferably between approximately 2,500 and 5,000 $Nm^3/h$ per 1 $m^2$ of free surface of the agglomerate bed for HBI briquettes. This measure seems absurd at the first impression. The preheating times are consequently so high that if the total production is to be preheated a plurality of preheating units have to be used for one smelting vessel. The longer preheating time furthermore leads to accordingly higher heat losses. However, the advantages predominate for the heating process, because the circulating inert gas does not have to be cooled after leaving the agglomerate bed to be heated, so that the total thermal efficiency is considerably higher than if heating were done faster. The apparatuses for heating are furthermore simpler.

The stated limiting value for the inert gas flow rate is to be understood as an average over the total heating period. For example, the gas flow rate can be below 8,000 $Nm^3/hm^2$ during the first half of the heating cycle when heating DRI pellets. In the second half the quantity of gas is then continuously reduced down to 1,000 $Nm^3/hm^2$. One can for example also start with 6,000 $Nm^3/hm^2$ and continuously reduce the total quantity down to 1,000 $Nm^3/hm^2$. When heating HBI briquettes, the heating gas flow rate can be for example 14,000 $Nm^3/hm^2$ during the first half of the heating cycle, the quantity of gas then being reduced continuously down to 2,000 $Nm^3/hm^2$ in the second half. However, one can also for example start with 12,000 $Nm^3/hm^2$ and continuously reduce the quantity of heating gas down to 2,000 $Nm^3/hm^2$. The operation mode stated in both examples has the result that the pressure drop in the heating vessel remains approximately constant over the total heating time.

To satisfy the inventive conditions, the geometric form of the heating vessel must be adapted accordingly. Thus, the ratio of clear vessel diameter to clear vessel height should be between 0.5 and 1.5 in the preheating vessel for heating DRI pellets. On average the clear vessel diameter should be approximately as great as the height of the pellet layer.

In the preheating vessel for heating HBI briquettes, the ratio of vessel diameter to vessel height should be between 1 and 3. On average the clear vessel diameter should be approximately half as great as the thickness of the agglomerate layer.

The stated conditions apply to vessels with a circular cross section. They can of course be transferred accordingly to any other geometric form.

It is advantageous according to the invention if the heating stream is passed onto the bed from above and flows through the bed from the top down. It is further advantageous if a conical taper is provided in the lower portion with this operating mode. Said portion is not to be taken into account in the above-mentioned geometric conditions for the heating vessel, however.

It has turned out that the shaping in the lower area makes it possible to obtain an advantageous effect on the approximately complete uniform heating of the DRI bed. If the cross section in the lower area is reduced to approx. ⅓ of the cross section in the upper heating vessel, the last portion of the bed is heated better than with a constant cross section.

Surprisingly, it has turned out that the recycled "inert gas" can be air. The oxygen of the air causes approx. 0.1% of the amount of iron to be oxidized at the onset of the heating process, but it is reduced again later. After only a short time the amount of oxygen present in the air is bound to the iron and the circulating gas for the heating process then consists only of a non-oxidizing gas.

The high degree of reduction of the wuestite content is of decisive importance when preheating the iron agglomerates. It reduces the energy requirement for smelting by approx. 25%. But it also makes the addition to a carbonaceous iron bath, which is the usual practice, simpler by preventing the foaming of the slag which otherwise occasionally occurs.

It has surprisingly turned out that the wuestite content of the agglomerates is reduced practically completely in the inventive method. The explanation for this is presumably that the CO content of the circulating inert gas increases very fast right at the onset of the wuestite reduction, thereby creating optimal conditions for the wuestite reduction. The effect can be supported if the pressure of the heating gas is changed in pulsating fashion. Pressure changes up to 20% are sufficient for this purpose.

The inventive reduction of the recycled gas quantity and the conical taper of the cross section in the lower portion of the heating vessel favor the high degree of reduction of the wuestite content of the agglomerate also in the lower portion of the heating vessel.

The wuestite reduction causes considerable amounts of CO to be formed, which are either burned off or collected and used as fuel gas for the heat exchanger, whereby this can cover approximately half of the energy requirement.

The inventive method thus favors the important reduction of the wuestite content in a double manner. There is the high CO content of the circulating gas, and the comparatively long heating time.

It has turned out that the conditions for inventive heating of sponge iron can be controlled in a simple way by measuring the temperature of the off-gas leaving the preheating vessel. If the off-gas temperature exceeds 200° C., the heating gas stream is reduced. The conditions for optimal heating are generally well reproducible. Occasional adjustments are required, however, because the fraction of agglomerates with a smaller grain size or also the fines fraction can fluctuate both in terms of quantity and in local distribution in the heating vessel.

The preheating temperature of the agglomerate should be between 800° C. and 1,100° C. Furthermore, it is advantageous if the C content of the agglomerate is at least 2%. These two conditions favor the complete reduction of the wuestite content.

It also belongs to the essence of the present invention to treat the surface of the pellets in such a way that they do not sinter at high preheating temperatures. This treatment is known from the direct reduction methods in the shaft furnace. The powders with which the pellets are dusted generally consist of MgO, CaO or compounds thereof. In this treatment, preheating temperatures up to 1,100° C. can be used.

The application of the inventive method permits the energy requirement for smelting agglomerates in the electric arc furnace to be reduced to less than 200 kWh/t of steel. A higher gangue content of the ores can also be tolerated more easily in the smelting process through the high preheating temperature.

An exemplary apparatus for carrying out the inventive method is shown in the attached picture. Said apparatus consists of a heating vessel, a regeneration plant for heating the inert gas, a fan and a cloth filter. The regeneration plant can be a bulk regenerator. Instead of the regenerator, however, it is also possible to use a recuperator. This makes the plant simpler, but reduces the highest possible temperature and the thermal efficiency.

The dust separated in the cloth filter is metallic and thus pyrophoric. It is therefore necessary to take corresponding measures so that the filter is always filled with inert gas. The dust can be simply oxidized, however, if the gas is enriched with a little water vapor, a saturation temperature of 20° C. being sufficient.

A particularly advantageous embodiment consists in the combination of a bulk regenerator altered for the present method. In this case the regenerator is operated with a substantially increased layer thickness of the bulk material. While the thickness of the radially flowed-through bulk layer is normally about 60 cm, it is approximately doubled in the inventive application. Thus, the stored heat suffices to heat the total DRI charge. This also results in an advantageous combination of the required pressure for the circulation of the inert gas. While the pressure drop continuously diminishes in the bulk regenerator, it rises in the preheating vessel. A certain adjustment of the pressure drop thus takes place during the heating process.

The shaping for the heating vessel is important. Let us take as an example the heating of a charge with 50 t of sponge iron. For 50 t of DRI pellets an inside volume of the vessel of approximately 30 m$^3$ is needed. The vessel has a clear diameter of 3.3 m and a height for the cylindrical portion of 4 m, of which about 3.5 m is filled with pellets. Above the pellets there remains a free space through which the hot inert gas is introduced. The hot gas flows through the filling from the top down. The lower portion of the vessel consists of a tapering cone in whose lower portion there are openings for venting the cooled inert gas.

For heating the charge, an inert gas quantity of altogether 40,000 Nm$^3$ is passed through the pellets to be heated. According to the invention one starts with an inert gas flow rate of 8,000 Nm$^3$/hm$^2$. At a diameter of the heating vessel of 3.3 m, the cross section is 8.6 m$^2$ and the gas flow rate 68,800 Nm$^3$/h. After 10 minutes the quantity of gas is reduced down to 1,000 Nm$^3$/hm$^2$ continuously within 40 minutes. The total heating time is approx. 50 minutes. The off-gas temperature at the end of the heating cycle is 180° C. It is unnecessary to cool the circulating inert gas.

Let us take as a second example the heating of a charge with 50 t of HBI. For 50 t of HBI an inside volume of the vessel of approximately 20 m$^3$ is needed. The vessel has a clear diameter of 2 m and a height for the cylindrical portion of 6 m, of which about 5.5 m is filled with HBI. Above the bed there remains a free space through which the hot inert gas is introduced. The hot gas flows through the filling from the top down. The lower portion of the vessel consists of a tapering cone in whose lower portion there are openings for venting the cooled inert gas.

For heating the charge, an inert gas quantity of altogether 40,000 Nm$^3$ is passed through the bed to be heated. According to the invention one starts with an inert gas flow rate of 7,000 Nm$^3$/hm$^2$. At a diameter of the heating vessel of 2 m, the cross section is 3.1 m$^2$ and the gas flow rate 21,700 Nm$^3$/h. After 20 minutes the quantity of gas is reduced down to 3,000 Nm$^3$/hm$^2$ continuously within two hours. The total heating time is approx. 2.3 hours. The off-gas temperature at the end of the heating cycle is 180° C. It is unnecessary to cool the circulating inert gas.

The pellets can be charged after heating into a smelting vessel via a slide-type closure on the bottom of the heating vessel. However, it may also be expedient to design the vessel so that it has the form of a charging box, the upper boundary then being a removable or hinged cover. The agglomerate is then emptied after preheating by being dumped into the smelting vessel, as when charging scrap.

Continuous preheating in connection with a smelting vessel is hardly conceivable. It would thus be necessary to use a heating gas flow rate of 120,000 Nm³/h for 50 t of pellets which are charged continuously within 20 minutes, which would require very elaborate regenerator plants and a high pressure. For the heating vessel this would also lead to unrealizable conditions.

The invention has been described in connection with an electric arc furnace as the smelting unit. It offers special advantages here, as described above. It is not restricted to this combination, however. It can be used in connection with any smelting unit. For example, the smelting unit can also be a converter. Preheating the DRI makes it possible to considerably increase the DRI addition. It is particularly advantageous here to use methods in connection with a bottom blown converter with heated-air postcombustion of the reaction gases. With a carbon content of about 4% in the pellets, liquid steel can be produced in such a converter upon application of the inventive method without any further supply of energy and without liquid pig iron.

The inventive method is not restricted to heating the stated iron agglomerates. Ferroalloys often have a similar lump size to HBI briquettes, but with a considerably greater fluctuation margin in lump size. These substances can also be heated in an apparatus according to the present invention. With a higher small-sized fraction it is advantageous to work at the lower limit of the inventive ranges, i.e. the ratio of diameter to height of the heating vessel should then be about 1 and the quantity of gas should be under 5,000 Nm³/hm². Depending on the grain spectrum the optimal values are to be determined experimentally. The inventive teaching leads to considerable savings of energy for smelting and to a corresponding increase in productivity.

The invention claimed is:

1. A method for preheating iron agglomerate by a stream of hot gas being an inert gas having the following steps:
    supplying iron agglomerate in form of HBI briquettes in an iron agglomerate bed;
    heating inert gas to a preheating temperature in a heat exchanger to provide the stream of hot gas;
    passing the stream of hot gas through the iron agglomerate bed with a gas flow rate in the range of 2,000 to 12,000 Nm³/hm², wherein said hot gas thereby transfers its heat energy to the iron agglomerate so that the hot gas cools to a resulting cooled gas;
    circulating the resulting cooled gas exiting the iron agglomerate bed to the heat exchanger;
    heating the resulting cooled gas to the preheating temperature of at least 800° C., and
    continuously recirculating the inert gas through the iron agglomerate bed and heat exchanger,
    wherein the gas flow rate of the stream of hot gas is such that the temperature drop of the hot gas in the iron agglomerate bed of HBI briquettes is such that a temperature front moves through the iron agglomerate bed in the course of heating,
        wherein the temperature of the gas leaving the iron agglomerate bed is initially reduced to a range of ambient temperature to about 10° C. above ambient temperature, and
        when the temperature front has traveled almost through the entire agglomerate bed, the temperature of the gas leaving the iron agglomerate bed is about 180° C. to 220° C.

2. The method according to claim 1, wherein the average value of the gas flow rate of the stream of hot gas over the total heating time is below 4,000 Nm³/h multiplied by the diameter of the iron agglomerates, measured in cm, based on 1 m² of surface of the iron agglomerate bed.

3. The method according to claim 1, characterized in that the stream of hot gas is passed onto the iron agglomerate bed from above through a free space.

4. The method according to claim 1, characterized in that iron agglomerate with a carbon content of 2-5% is healed by a stream of hot gas being an inert gas having a temperature of 800° C. to 1,100° C.

5. The method according to claim 1, characterized in that the gas how rate of the stream of hot gas is controlled by the off-gas temperature.

6. The method according to claim 1, characterized in that when preheating the HBI briquettes the ratio of the height of the HBI briquette bed to the cross section of the HBI briquette bed is adjusted between 1 and 3.

7. The method according to claim 1, characterized in that the circulating stream of hot gas exits the heating vessel containing the iron agglomerate bed through a conical socket in which the cross section is reduced to at least ⅓ of the cross section of the heating vessel.

8. The method according to claim 1, characterized in that the pressure of the stream of hot gas is varied up to 20% based on the average pressure of the hot stream of gas.

* * * * *